United States Patent [19]
Martin

[11] Patent Number: 5,963,981
[45] Date of Patent: Oct. 5, 1999

[54] SYSTEM AND METHOD FOR UNCACHED STORE BUFFERING IN A MICROPROCESSOR

[75] Inventor: Randal Gordon Martin, San Jose, Calif.

[73] Assignee: Silicon Graphics, Inc., Mountain View, Calif.

[21] Appl. No.: 08/539,524

[22] Filed: Oct. 6, 1995

[51] Int. Cl.⁶ .............................. G06F 12/00; G06F 13/00
[52] U.S. Cl. .......................... 711/170; 711/118; 711/201; 711/209; 711/138; 345/507
[58] Field of Search .............................. 395/419, 421.01, 395/421.02, 421.08, 453, 465, 411, 497.01, 497.02, 497.03; 345/507; 711/170, 171, 172, 201, 126, 138, 118, 209, 211, 212, 218

[56] References Cited

U.S. PATENT DOCUMENTS

| | | | |
|---|---|---|---|
| 4,292,674 | 9/1981 | Scheuneman | 711/3 |
| 4,381,541 | 4/1983 | Baumann, Jr. et al. | 711/128 |
| 4,407,016 | 9/1983 | Bayliss et al. | 710/3 |
| 4,621,320 | 11/1986 | Holste et al. | 711/213 |
| 4,805,098 | 2/1989 | Mills, Jr. et al. | 711/118 |
| 5,023,776 | 6/1991 | Gregor | 711/122 |
| 5,513,330 | 4/1996 | Stiles | 395/380 |
| 5,517,660 | 5/1996 | Rosich | 711/117 |
| 5,519,839 | 5/1996 | Culley et al. | 395/310 |
| 5,561,780 | 10/1996 | Glew et al. | 711/126 |

Primary Examiner—Eddie P. Chan
Assistant Examiner—Hong C. Kim
Attorney, Agent, or Firm—Sterne, Kessler, Goldstein & Fox P.L.L.C.

[57] ABSTRACT

In a microprocessor system utilizing a cache memory, an uncached store buffer is provided for efficiently providing uncached store data and uncached store addresses to a multiplexed system interface address/data bus. The uncached store buffer includes detector means, coupled to receive uncached store addresses, for detecting on-the-fly successive uncached store addresses which are identical, and for detecting on-the-fly successive uncached store addresses which are sequential. The uncached store buffer further includes an address buffer, coupled to receive and store a plurality of the uncached store addresses, and control logic, coupled to an output of the detector means, having a control signal. A data buffer, coupled to receive uncached store data, is further provided to store a plurality of blocks of the uncached store data. The uncached store data is arranged in the data buffer without gaps under the control of the control signal. Finally, an output multiplexer, having a first input coupled to an output of the address buffer, a second input coupled to an output of the data buffer, and an output coupled to the multiplexed system interface address/data bus, is provided to selectively issue the uncached store addresses and the uncached store data to the multiplexed system interface address/data bus.

17 Claims, 3 Drawing Sheets

SYSTEM AND METHOD FOR UNCACHED STORE BUFFERING IN A MICROPROCESSOR

BACKGROUND OF THE INVENTION

1. Field of the Invention

The present invention relates to a memory buffer in a microprocessor, and more particularly to the design of a buffer in a cached memory system for gathering uncached store operations so that the store data is efficiently issued to the system interface utilizing substantially all of the available system interface bandwidth.

2. Related Art

Modern microprocessing systems often employ cache memory as part of an overall memory hierarchy to reduce the amount of time required for memory accesses. The cache occupies the highest position in the memory hierarchy, shuttling data between the central processing unit (CPU) and the main memory unit (MMU). Any performance gains achieved through the use of a cache are premised on the theory of locality: all programs favor a portion of their address space at any instant of time. Cache memory ideally stores this portion of the address space using fast, but expensive, memory hardware. The MMU stores a much larger amount of data used by the application in slower, less expensive memory. If the CPU looks only for data within this favored address space, and the address space fits within the cache, the memory bandwidth available to the CPU is equal to that of the faster cache memory. The model breaks down as the CPU fails to find the data it needs within the cache, and is forced to access the slower MMU.

Whereas cached accesses make use of the cache memory for improved performance, certain other types of memory operations bypass the cache completely to directly access external memory locations. These operations, termed "uncached" accesses, are typically used for initialization, diagnostic/error handling routines, and where data is to be written to an external device rather than stored in the MMU.

For instance, graphics software routines often store data to a frame buffer or graphics engine for displaying an image on a video device. A frame buffer is a hardware memory device used to store the image displayed on screen. The image data is stored pixel by pixel in adjacent memory locations and read out to the graphics display at the refresh rate. The term graphics engine refers to a separate unit having its own memory and processor for driving an output video device. The CPU communicates with the graphics engine by writing data to a single address, or port. The uncached store operation bypasses the cache and writes the data to the external device specified by the given address. Uncached stores issued by graphics software routines to a frame buffer often consist of numerous, sequentially-addressed memory accesses. On the other hand, uncached stores to a graphics engine often consist of numerous, identically-addressed memory accesses.

Microprocessor designs should ideally provide a high uncached store throughput with a minimum amount of system overhead. Typically, uncached store throughput is limited by the available system interface bandwidth. Microprocessors that implement a multiplexed system interface address/data bus require two system clock cycles to issue one individual uncached store operation. The term "individual" store operations is used in this context to distinguish operations which store a single data element to a single memory location, as opposed to "block" operations which store multiple data elements to multiple memory locations beginning at a specified address. All individual store operations using the bus send an address during a first clock cycle, followed by data on the next cycle. Therefore, individual uncached store operations can achieve no better than half the available system bandwidth.

Often, some type of arbitration must be performed before a microprocessor can issue uncached store operations to the system interface. System resources must be expended to resolve this contention each time and operation requests use of the bus. Thus, issuing numerous, individual uncached stores is often inefficient due to the overhead associated with bus arbitration and the fact that the throughput is limited to half the available bandwidth. Since bursts of sequentially and identically addressed uncached accesses are common, a method to increase their throughput is desirable.

Special purpose memory buffers have been designed to improve the throughput of uncached stores. These buffers, known as store gatherers, collect uncached store operations and issue the store data as a block operation rather than as a series of individual stores. Such uncached store buffers have been implemented in external agent chips, which typically provide an interface between the microprocessor's system interface and a backplane bus. Such store gatherers minimize system overhead, since a block store requires a single backplane bus arbitration, rather than a separate arbitration for each of a series of store operations.

However, current store gatherers are functionally limited in a number of ways. No provision is made for handling identically and sequentially addressed streams of uncached store data. Current systems also do not operate efficiently when the gathered data does not precisely fill a complete block. Variable length blocks occur when the block must be sent to the bus before the block is completely filled. Variable length blocks also occur when a double-word store straddles the end of one block and the beginning of the next. Here, current store gatherers issue the first incomplete block, and begin collecting the next block with the double-word store data. The complexity of the overall system is increased when the system is required to handle variable length blocks. Furthermore, current store gatherers are not located on the microprocessor chip itself.

Thus, what is needed is an uncached store gatherer that resides on the microprocessor chip itself, provides for streams of both sequential and identical addresses, and efficiently handles variable length blocks.

SUMMARY OF THE INVENTION

The present invention relates to the design of a memory buffer for gathering uncached store data. The present invention is well suited to handling uncached store operations associated with graphics software routines. Consequently, the present invention provides an efficient means for issuing either identically or sequentially addressed uncached store data to a multiplexed system interface address/data bus. The present invention also efficiently handles variable length block conditions.

An uncached store buffer is provided that begins gathering uncached store data when a gatherable, block-aligned uncached store address is received. The uncached store buffer enters either a sequential or identical gathering mode based on the received addresses. An address compare logic compares the current address to a previous address stored in an address compare register to determine whether the addresses are sequential or identical. A control logic uses the result of this compare operation to control the remaining elements of the uncached store buffer.

A pair of data multiplexers, responsive to the control logic, insure that single and double-word store data is efficiently packed into a data buffer without gaps (i.e., unused memory locations). The control logic also handles double-words which straddle two blocks. The first word of the double-word fills the first block which is then sent to the system interface, and the second word begins the next block.

The data buffer issues block data to the system interface as an address cycle, followed by a series of data cycles. An address buffer stores the address of each block contained in the data buffer. In block output mode, an output multiplexer selects an address stored in the address buffer, followed by data stored in the data buffer. The output multiplexer is connected to the multiplexed system interface address/data bus.

In the event that the current gathering mode is broken, before a block is completely filled, the data buffer issues the partially gathered block to the system interface as a series of individual uncached store operations rather than as a variable-sized block. Here, the output multiplexer alternatively selects an address then data to complete the individual uncached store operations.

A feature and advantage of the present invention is that the uncached store buffer determines the appropriate gathering mode based on the incoming addresses, rather than requiring additional address space to designate the appropriate mode.

Another feature and advantage of the present invention is that the uncached store buffer efficiently handles variable length blocks that result when a double-word store straddles two blocks, or when gathering is interrupted before a block is completely filled.

Another feature and advantage of the present invention is that both single and double-word store data may be freely intermixed and is nevertheless efficiently packed into the buffer without gaps.

BRIEF DESCRIPTION OF THE DRAWINGS

The foregoing and other features and advantages of the invention will be apparent from the following, more particular description of a preferred embodiment of the invention, as illustrated in the accompanying drawings.

The preferred embodiment of the invention is now described with reference to the figures where like reference numbers indicate like elements. Also in the figures, the left most digits of each reference number corresponds to the figure in which the reference number is first used.

DETAILED DESCRIPTION OF THE INVENTION

The preferred embodiment of the invention is discussed in detail below. While specific configurations are discussed, it should be understood that this is done for illustration purposes only. A person skilled in the relevant art will recognize that other components and configurations may be used without parting from the spirit and scope of the invention.

Figure 1:
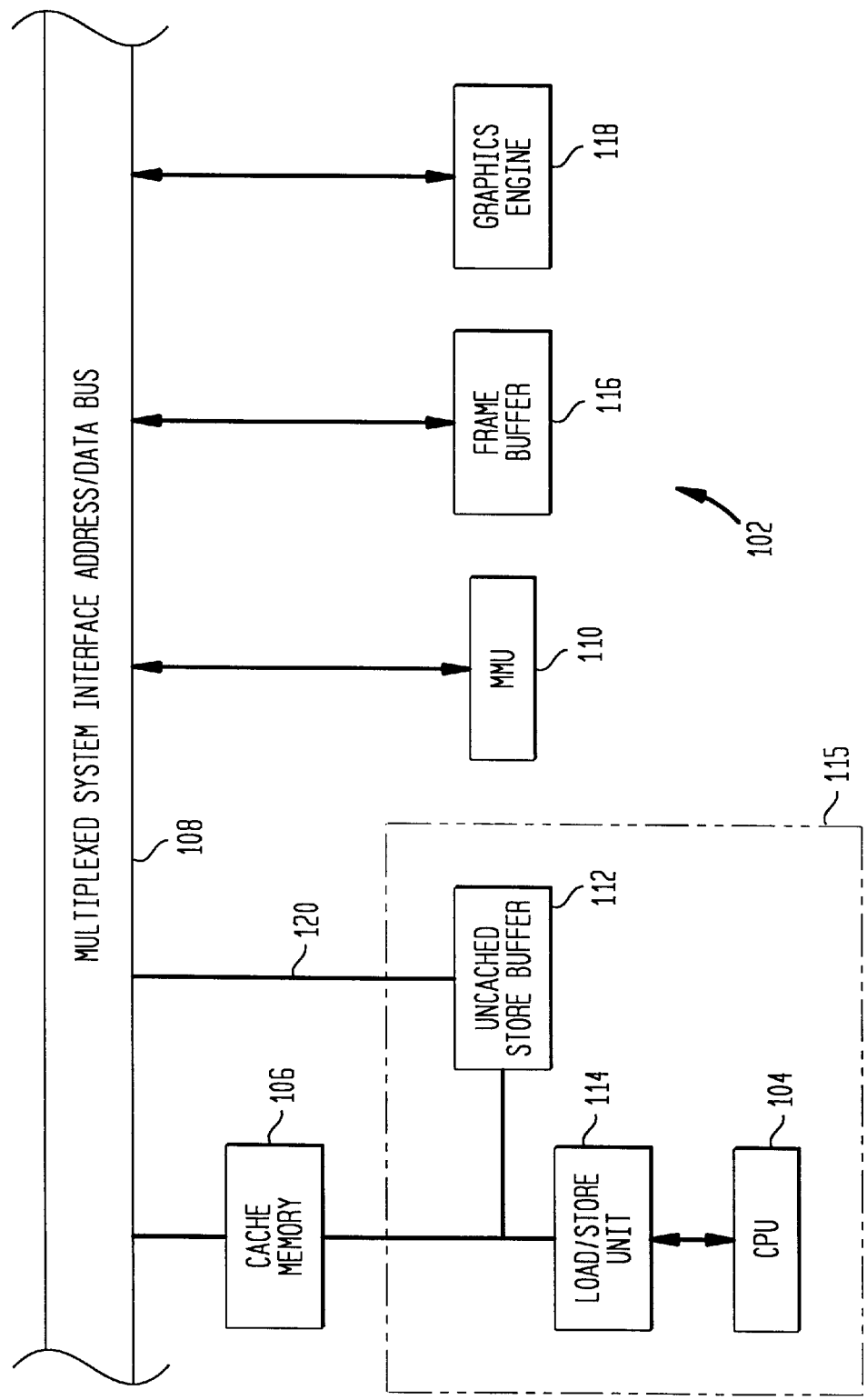
FIG. 1 is a block diagram of a microprocessor system with a cache memory.

FIG. 1 is a block diagram of a microprocessor system 102 utilizing a cache memory. The microprocessor system 102 includes a central processing unit (CPU) 104 which communicates with an off-chip cache memory 106. The cache memory 106 communicates with the main memory unit (MMU) 110 via a multiplexed system interface address/data bus (multiplexed system bus) 108. The data held in the cache memory 106 is a subset of the data held in the MMU 110. Note that although cache memory 106 is off-chip in a preferred embodiment, on-chip caches are also contemplated by the present invention.

In a preferred embodiment, a load/store unit (LSU) 114, an uncached store buffer (USB) 112, and a CPU 104 are implemented on the same microprocessor chip 115. The LSU 114 performs data input/output (I/O) functions under the control of the CPU 104, and is connected to the USB 112, and to the off-chip cache memory 106. The LSU 114 issues cached memory accesses first to the cache memory 106. If the address is not found within the cache memory 106, the data is retrieved from the MMU 110 (or some other external storage device) via the multiplexed system bus 108 using a conventional cache-miss or store-miss routine. Store-miss routines are well known to those skilled in the art.

The LSU 114 issues uncached memory accesses to the USB 112, which is connected directly to the multiplexed system bus 108 via the output address/data bus 120. Thus, uncached memory operations effectively bypass the cache memory 106. The USB 112 gathers uncached stores in a manner described in more detail below, and then issues the gathered data to the multiplexed system bus 108.

Uncached store operations may be designated as such in a manner convenient to the overall system design. Two example alternatives would be to specify uncached stores by a certain virtual address range or within the translation-lookaside buffer (TLB). One skilled in the art will readily recognize these, and other alternatives for designating uncached store operations.

In a preferred embodiment, uncached store operations are often directed to a frame buffer 116 or a graphics engine 118, both connected to the multiplexed system bus 108. Graphics software routines typically write image data to external video devices as streams of uncached store data. Each consecutive uncached store operation directed to a frame buffer will access a memory location adjacent to the previously accessed location. The software routine fills the frame buffer memory with image data, where each memory location represents the value of a single pixel in the image. The frame buffer then sends the data to a video device (not shown) at a specified refresh rate. Thus, graphics software routines often issue streams of uncached store operations to a frame buffer accessing sequentially addressed memory locations.

Graphics software routines also commonly access devices known as graphics engines. Graphics engines perform the operations necessary to drive a video device, operations normally performed by the CPU, thereby allowing the CPU to divert those resources elsewhere. Graphics engines typically have their own processor and memory for storing image data. In a preferred embodiment, the CPU 104 communicates with a graphics engine 118 via the multiplexed system bus 108. The CPU 104 directs data to the graphics engine 118 through a single address, or port. Again, graphics routines commonly send image data to a graphics engine as a stream of uncached store data, whereupon the graphics engine performs the processing necessary to display the desired image. Thus, graphics software routines often issue streams of uncached store operations to a graphics engine accessing identically addressed memory locations.

As shown in FIG. 1, USB 112 is located directly on the microprocessor chip 115. Bandwidth within the microprocessor chip is much higher (e.g., 2 to 4 times) than the microprocessor's system interface bandwidth. Thus, placing the uncached store buffer on the microprocessor itself allows rapid bursts of uncached stores from LSU 114 to be efficiently buffered on the microprocessor itself. Furthermore, since the uncached store gatherer issues gathered, uncached stores as block operations, the microprocessor may use a multiplexed system interface bus, without significantly lowering the effective uncached store bandwidth. A multiplexed system interface bus saves a significant number of interface pins, thereby reducing package costs on both the microprocessor and the external agent chips.

This is advantageous for two reasons. First, uncached store throughput approaches the available system bandwidth as the block size increases. Only one address need be sent followed by a stream of data, resulting in a throughput of N/(N+1) where N is the size of the block and a throughput value of "1" represents the maximum available bandwidth. Second, system overhead is minimized. The block store requires a single bus arbitration, rather than a separate arbitration for each of a series of store operations. Thus, store gatherers provide a more efficient means for issuing uncached store data over a multiplexed system interface address/data bus.

Figure 2:
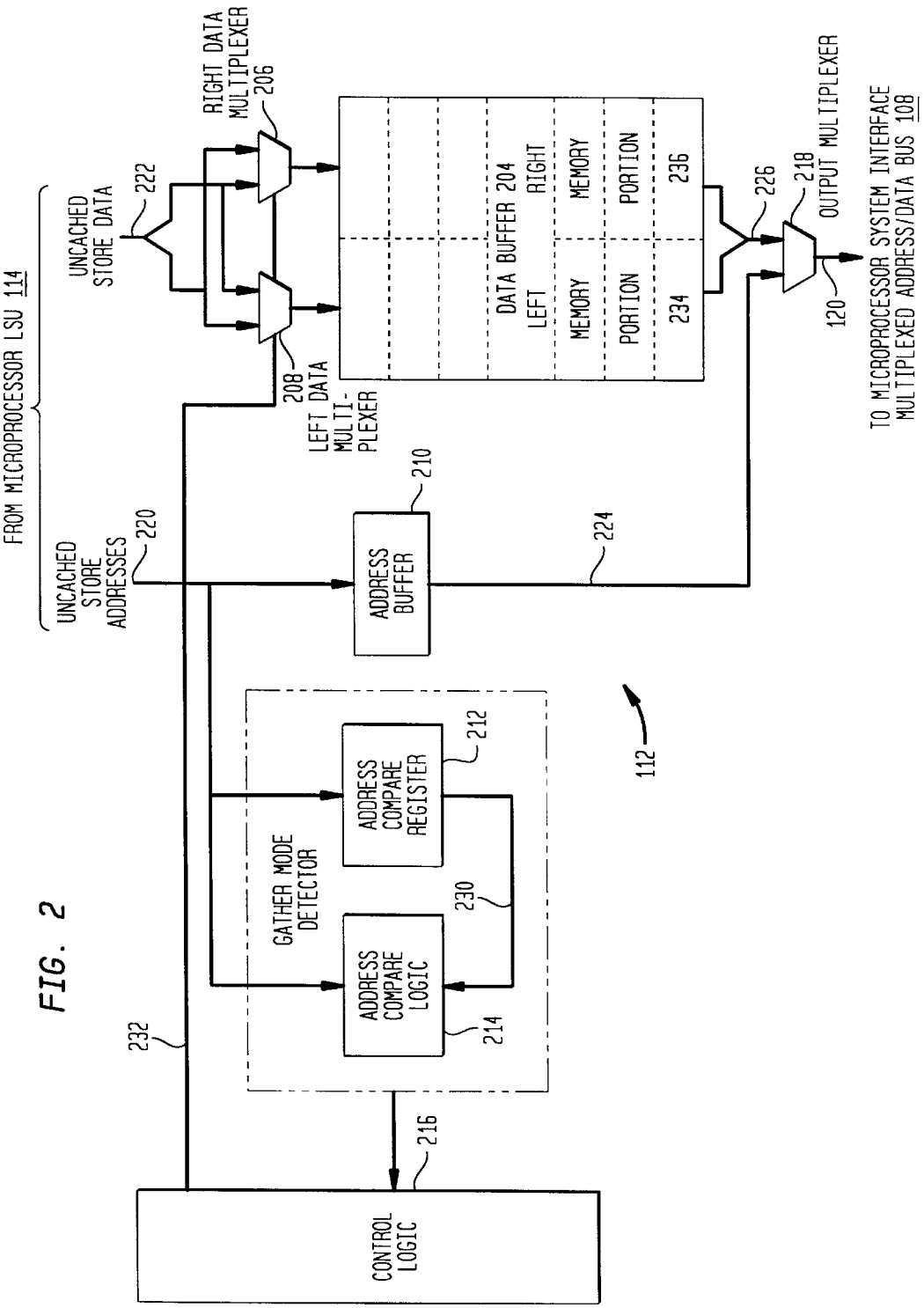
FIG. 2 is a block diagram of the present invention illustrating an uncached store buffer which receives data from a load/store unit in a CPU and sends data to a multiplexed system interface address/data bus.

FIG. 2 is a block diagram of the present invention illustrating the USB 112 which receives addresses and data from an LSU 114 and sends addresses and data to a multiplexed system bus 108. The USB 112 gathers uncached stores in a data buffer 204 until one of a certain number of specified events occurs, at which time the stored data is sent to the multiplexed system bus 108 in one of two modes: as a block or as a series of single or double word uncached store operations.

The following description discusses the hardware implementation of the USB 112 first. This is followed by a description, with respect to FIG. 3, of the control methodology for determining how the uncached store data should be gathered and when the data should be issued as a block or as a series of uncached store operations.

Referring first to FIG. 2, the LSU 114 directs uncached store operations to the USB 112 over an address bus 220 and a data bus 222. Uncached store addresses are gathered in address buffer 210, which is designed to hold one address for every block of data capable of being stored in data buffer 204. In a preferred embodiment, the address buffer holds two uncached store addresses, and correspondingly, the data buffer 204 has a two block storage capacity. This allows the buffer to simultaneously fill one block while sending another to the multiplexed system bus 108 (i.e., double buffering).

Each address stored in address buffer 210 identifies the location of the first data element within one of the blocks being gathered in data buffer 204. In a preferred embodiment, these addresses must be block-aligned (i.e., (address) MOD (block size)=0) in order for the buffer to begin gathering, as is described in more detail below with reference to FIG. 3. This restriction simplifies the manner in which block stores are handled by the system.

Address data from the address bus 220 is also routed to an address compare register 212 and an address compare logic 214. The USB 112 begins gathering when a block-aligned, uncached double or single-word store is executed. This address is stored in address compare register 212 when the next uncached store address appears on address bus 220. Address compare logic 214 compares the address stored in the address compare register 212 to the address on address bus 220. If the addresses are either identical or sequential, the USB 112 continues gathering the uncached store operations until such time as the gathered data is sent to the multiplexed system bus 108.

The results of the compare operation are used by control logic 216 to direct the operation of the USB 112 in accordance with the control methodology described below. Thus, the gathering mode, sequential or identical, is detected "on-the-fly," i.e., the determination is based on the received addresses rather than by address designation. This allows the USB 112 to correctly gather sequentially or identically addressed data without having to use additional address space.

Uncached store data is sent to the USB 112 via data bus 222. Both single and double-word uncached store operations are accommodated. The first and second words of data are provided to the first and second inputs of left and right data multiplexers 208 and 206. These multiplexers perform a data swapping operation under the control of control logic 216, to insure that the gathered data is efficiently packed into data buffer 204.

The output of left data multiplexer 208 is connected to a left memory portion 234 of data buffer 204. Similarly, the output of right data multiplexer 206 is connected to a right memory portion 236 of data buffer 204. Control logic 216 causes the left and right data multiplexers to select the first or second word of uncached store data so that the data is packed alternatively into the right then left memory portions.

For example, if a single-word store appears first, the right data multiplexer 206 would select the single word in order that it be placed in the first position of the right memory portion 236. If a double word store were received next, the left data multiplexer 208 would select the first word in order that it be placed in the first position of the left memory portion 234. The right data multiplexer 206 would select the second word in order that it be placed in the second position of the right memory portion 236. Thus, single and double-word data may be freely intermixed and the data will nevertheless be efficiently packed into the right and left memory portions without gaps.

Gathered uncached store data may be output from the USB 112 in one of two different modes. In a first mode, the data may be issued to the multiplexed system bus 108 in block format. A block-aligned address stored in the address buffer 210 is transferred to one input of an output multiplexer 218 along line 224. The output multiplexer 218 first selects the address, placing the address on the output address/data bus 120 which is connected to the multiplexed system bus 108. The output multiplexer 218 then selects the data line 226 which is connected to the left and right memory portions of data buffer 204. Uncached store data words are output in serial fashion, in the order in which they were received, to the output address/data bus 120 until an entire block is sent. In a preferred embodiment, the data buffer 204 may begin gathering the next block while the first block is being output in serial fashion. However, it is contemplated that the data buffer 204 will wait until the data block is output before gathering the next block.

The USB 112 may also issue data to the multiplexed system bus 108 in a second mode as a series of individual store operations. If gathering is interrupted for any of the reasons described below, and an incomplete block is gathered, the buffer issues the gathered data as one or more individual uncached store operations. The output multiplexer 218 alternatively selects the address line 224 and the data line 226 to issue the individual store operations, either as single or double words. By issuing data only as complete blocks, or as individual store operations, the system is not required to support variable length blocks. As would be apparent to one skilled in the art, this results in a considerable savings in overall system complexity.

Figure 3:
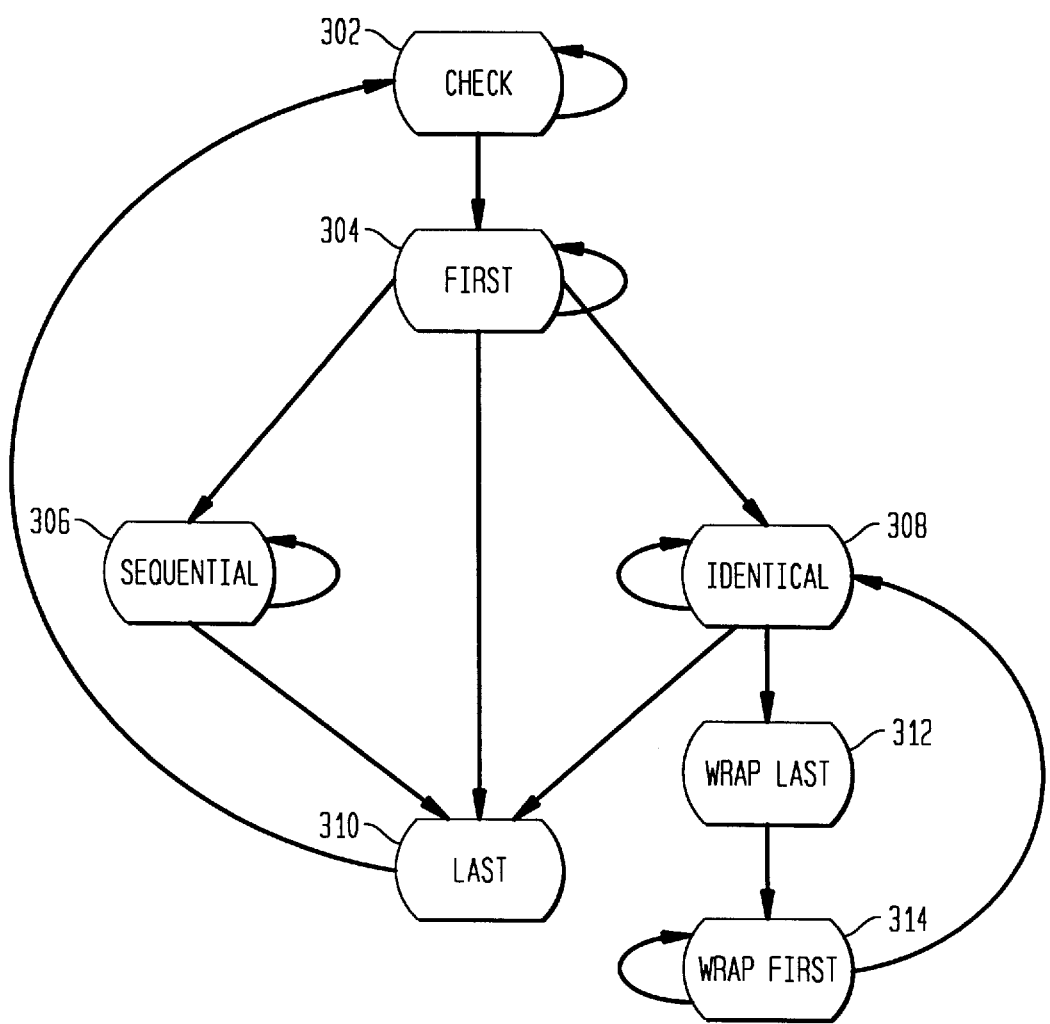
FIG. 3 presents a state diagram for the control methodology followed by the uncached store buffer.

FIG. 3 presents a state diagram for the control methodology followed by the USB 112. The USB 112 begins in the state CHECK 302, waiting for a gatherable uncached store operation. Uncached stores are gatherable if they are block-aligned, single or double-word stores.

Once a gatherable uncached store has been received, the USB 112 enters a FIRST state 304. At this point the gatherable uncached address is loaded into the address buffer 210 (see FIG. 2). The USB 112 then waits for the next uncached access. Depending upon what is received, the USB 112 enters either the SEQUENTIAL state 306, the IDENTICAL state 308, or the LAST state 310.

The USB 112 will enter the LAST state 310 upon the occurrence of several events, regardless of whether the USB 112 is currently in the FIRST state 304, SEQUENTIAL state 306, or IDENTICAL state 308. The gathered data is then output according to either the first or second output mode, as described above, depending upon which event triggers the LAST state 310. Gathering is terminated upon entry to LAST state 310. After the data has completed being output, USB 112 enters CHECK state 302 where it again waits for a gatherable uncached accelerated store.

The first of these events occurs when a complete block has been gathered, resulting in the data being output according to the first output mode. As described above, the first output mode for the data buffer 204 is an address cycle, followed by a number of data cycles sufficient to send a complete block. This results in an uncached store throughput close to the maximum bandwidth supported by the multiplexed system bus 108 (i.e., one word of data transferred every cycle); the larger the block, the closer the throughput gets to the maximum bandwidth.

The remainder of the events which trigger the LAST state 310 result in the second output mode being used. As described above, the data buffer 204 sends data to the multiplexed system bus 108 in the second output mode as a series of individual uncached store operations (i.e., address cycle, data cycle, address cycle, data cycle, ... ). By sending incomplete blocks as individual uncached store operations, the system is relieved of the responsibility of handling variable sized blocks. In a preferred embodiment, the benefits resulting from this reduction in complexity outweigh the performance lost by using individual store operations.

Two events trigger the LAST state 310 and the second output mode. The first occurs when the current gathering mode (i.e., sequential or identical) is broken. For example, if the buffer begins gathering sequentially addressed uncached store data but receives an identically addressed uncached store operation before the buffer is filled, the current gathering mode (sequential) is broken. The data buffer 204 then sends the incomplete block of sequentially addressed data to the multiplexed system bus 108 in the second output mode. After the data has completed being output, USB 112 enters CHECK state 302 where it again waits for a gatherable uncached accelerated store.

The second event which triggers the LAST state 310 and the second output mode occurs when a non-gatherable uncached access is executed. The USB 112 only gathers single and double-word uncached store operations, and only begins on a block-aligned address. Two examples of non-gatherable operations are uncached loads and uncached partial-word stores. If the buffer receives any non-gatherable uncached operation before a complete block has been gathered, the data buffer 236 is emptied according to the second output mode. After the data has completed being output, USB 112 enters CHECK state 302 where it again waits for a gatherable uncached accelerated store.

Referring again to FIG. 3, the USB 112 enters the FIRST state 304 when a gatherable, block-aligned uncached store operation is received. Assuming that the next uncached operation is gatherable, the USB 112 will either enter the SEQUENTIAL state 306 or the IDENTICAL state 308, depending upon the address of the operation.

As with the graphics engine discussed above, streams of identically addressed uncached store data are commonly used to send data to a single address, or port. It is also not uncommon that these streams of data contain a mixture of single and double-word stores. This presents a problem when the data buffer 204 receives a double-word of data, but only requires a single word to complete the current block. In a preferred embodiment, the buffer provides for this situation where a double-word of data straddles two blocks.

The USB 112 remains in the IDENTICAL state 308 so long as gatherable, identically addressed uncached stores are received. The USB 112 enters the WRAP LAST state 312 when a double-word store wraps over a block boundary. The USB 112 completes the current block with a single word of the wrapping double-word, and then proceeds to the WRAP FIRST state 314. Here, the USB 112 begins gathering a new block with the other single word of the wrapping double-word and returns to the IDENTICAL state 308 discussed above.

The USB 112 enters the SEQUENTIAL state 306 from the FIRST state 304 when sequential addresses are received. Addresses are sequential when the current address is equal to the previous address plus the number of words being stored (i.e., one or two). For implementation efficiency, the LSUs of most modern CPU's do not support unaligned accesses. Single-word accesses must be to a single-word aligned address, and double-word accesses must be to a double-word aligned address, otherwise an addressing exception is taken. Consequently, a stream of sequentially addressed uncached store data will never result in the situation where a double-word of data straddles two blocks.

While the invention has been particularly shown and described with reference to preferred embodiments thereof, it will be understood by those skilled in the art that various changes in form and details may be made therein without departing from the spirit and scope of the invention.

What is claimed is:

1. An uncached store buffer, in a microprocessor utilizing a cache memory system, for efficiently providing uncached store data and uncached store addresses to a multiplexed system interface address/data bus, that allows the transfer of uncached store data to bypass the cache memory system, said uncached store buffer comprising:

detector means, coupled to receive uncached store addresses, for detecting on-the-fly successive uncached store addresses which are identical, and for detecting on-the-fly successive uncached store addresses which are sequential;

an address buffer, coupled to receive and store a plurality of said uncached store addresses;

control logic, coupled to an output of said detector means, having a control signal output;

a data buffer, coupled to receive uncached store data, configured to store a plurality of blocks of said uncached store data in packed fashion, said uncached store data arranged under the control of said control signal output in said data buffer without gaps; and an output multiplexer, having a first input coupled to an output of said address buffer, a second input coupled to an output of said data buffer, and an output of said output multiplexer coupled to the multiplexed system interface address/data bus, configured to selectively issue said uncached store addresses and said uncached store data to the multiplexed system interface address/data bus.

2. The uncached store buffer of claim 1, wherein said detector means comprises:

an address compare register, coupled to receive said uncached store addresses; and address compare logic, configured to compare a current uncached store address with a previous uncached store address, having a first input coupled to receive said uncached store addresses, and a second input coupled to an output of said address compare register.

3. The uncached store buffer of claim 2, wherein said data buffer comprises:

a left memory portion configured to store a plurality of data words in serial fashion;

a right memory portion configured to store a plurality of data words in serial fashion;

a left data multiplexer, coupled to receive said uncached store data, said uncached store data comprising single- and double-word data, configured to provide a selected word of said single- and double-word data to said left memory portion in response to said control signal; and a right data multiplexer, coupled to receive said single- and double-word data, configured to provide a selected word of said single- and double-word data to said right memory portion in response to said control signal.

4. A method for efficiently providing blocks of uncached store data to a multiplexed system interface address/data bus comprising the steps of:

(1) storing a first gatherable uncached store address, said first gatherable uncached store address comprising block-aligned uncached store addresses which access single- or double-word uncached store data;

(2) storing a second gatherable uncached store address, said second gatherable uncached store address comprising uncached store addresses which access single- or double-word uncached store data;

(3) comparing said first and second gatherable uncached store addresses;

(4) selecting an identical gathering mode when said first and second gatherable uncached store addresses are identical;

(5) selecting a sequential gathering mode when said first and second gatherable uncached store addresses are sequential;

(6) storing gatherable uncached store data in packed fashion based on said identical and sequential gathering modes; and (7) issuing said uncached store data to the multiplexed system interface address/data bus.

5. The method of claim 4, wherein the step of storing gatherable uncached, store data based on said identical and sequential gathering modes comprises the steps of:

(a) storing gatherable uncached store data in said identical gathering mode when said identical gathering mode is selected, comprising the steps of:

(i) storing identically addressed uncached store data until interrupted, and (ii) interrupting said storing when a complete block is gathered and then selecting a block output mode; and (b) storing gatherable uncached store data in said sequential gathering mode when said sequential gathering mode is selected, comprising the steps of:

(i) storing sequentially addressed uncached store data until interrupted, and (ii) interrupting said storing when a complete block is gathered and then selecting said block output mode.

6. The method of claim 5, wherein the step of storing gatherable uncached store data in said identical gathering mode when said identical gathering mode is selected further comprises the step of interrupting said storing when both double-word store data is received and only a single word of space remains in a current block, completing said current block with the first word of said double-word store data, storing the second word of said double-word store data in a next block, and then selecting said block output mode.

7. The method of claim 6, wherein the step of storing gatherable uncached store data in said identical gathering mode when said identical gathering mode is selected further comprises the step of interrupting said storing when a non-identically addressed uncached store is received and then selecting an individual output mode.

8. The method of claim 7, wherein the step of storing gatherable uncached store data in said identical gathering mode when said identical gathering mode is selected further comprises the step of interrupting said storing when a non-gatherable uncached operation is received and then selecting said individual output mode.

9. The method of claim 5, wherein the step of storing gatherable uncached store data in said sequential gathering mode when said sequential gathering mode is selected further comprises the step of interrupting said storing when a non-sequentially addressed uncached store is received and then selecting said individual output mode.

10. The method of claim 9, wherein the step of storing gatherable uncached store data in said sequential gathering mode when said sequential gathering mode is selected further comprises the step of interrupting said storing when a non-gatherable uncached operation is received and then selecting said individual output mode.

11. The method of claim 4, wherein the step of issuing said uncached store data to the multiplexed system interface address/data bus comprises the steps of:

(a) issuing said uncached store data to the multiplexed system interface address/data bus in a block output mode when said block output mode has been selected, comprising the steps of:

(i) writing an uncached store address corresponding to the beginning address of said complete block to the multiplexed system interface address/data bus, and (ii) writing the uncached store data in said complete block to the multiplexed system interface address/data bus; and (b) issuing said uncached store data to the multiplexed system interface address/data bus in an individual output mode when said individual output mode has been selected, comprising the step of writing an uncached store address, followed by a corresponding uncached store data, until all of said gathered data has been written to the multiplexed system interface address/data bus.

12. A computer system, comprising:

a processor, connected to a memory that stores data;

a cache, connected to said processor via a microprocessor system interface, for storing a subset of said data;

an uncached store buffer, connected to said processor, that allows data to be written via a multiplexed system address/data bus from said processor to an external device, while bypassing said cache, said uncached store buffer including:

detector means, coupled to receive uncached store addresses, for detecting on-the-fly successive uncached store addresses which are identical, and for detecting on-the-fly successive uncached store addresses which are sequential;

an address buffer, coupled to receive and store a plurality of said uncached store addresses;

control logic, coupled to an output of said detector means, having a control signal output;

a data buffer, coupled to receive uncached store data, configured to store a plurality of blocks of said uncached store data in packed fashion, said uncached store data arranged under the control of said control signal output in said data buffer without gaps; and an output multiplexer, having a first input coupled to an output of said address buffer, a second input coupled to an output of said data buffer, and an output of said output multiplexer coupled to the multiplexed system interface address/data bus, configured to selectively issue said uncached store addresses and said uncached store data to the multiplexed system interface address/data bus.

13. The system according to claim 12, wherein said uncached store address and data is issued to said external device.

14. The system according to claim 13, wherein said external device is a frame buffer.

15. The system according to claim 13, wherein said external device is a graphics engine.

16. The system according to claim 12, wherein said detector means comprises:

an address compare register, coupled to receive said uncached store addresses; and address compare logic, configured to compare a current uncached store address with a previous uncached store address, having a first input coupled to receive said uncached store addresses, and a second input coupled to an output of said address compare register.

17. The system according to claim 16, wherein said data buffer comprises:

a left memory portion configured to store a plurality of data words in serial fashion;

a right memory portion configured to store a plurality of data words in serial fashion;

a left data multiplexer, coupled to receive said uncached store data, said uncached store data comprising single- and double-word data, configured to provide a selected word of said single- and double-word data to said left memory portion in response to said control signal; and a right data multiplexer, coupled to receive said single- and double-word data, configured to provide a selected word of said single- and double-word data to said right memory portion in response to said control signal.

* * * * *